Patented Apr. 11, 1933

1,903,602

UNITED STATES PATENT OFFICE

KARL STREITWOLF, OF FRANKFORT-ON-THE-MAIN, ALFRED FEHRLE, OF BAD SODEN ON TAUNUS, AND WALTER HERRMANN, OF FRANKFORT-ON-THE-MAIN, GERMANY, ASSIGNORS TO WINTHROP CHEMICAL COMPANY, INC., OF NEW YORK, N. Y., A CORPORATION OF NEW YORK

BENZIMIDAZOLONE-STIBONIC ACIDS

No Drawing. Application filed October 25, 1929, Serial No. 402,540, and in Germany November 7, 1928.

The present invention relates to benzimidazolone-stibonic acids, more particularly to compounds of the following formula:

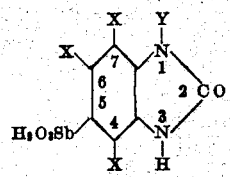

wherein X stands for hydrogen, alkyl, halogen, amino or nitro groups, and Y stands for hydrogen or alkyl.

We have found that the benzimidazolone-stibonic acids have unexpectedly important effects on protozoa diseases, which the known stibonic acids have not to this extent. For the use in therapy the stibonic acids are preferably transformed into a soluble salt.

The benzimidazolone-stibonic acids can be prepared by causing ortho-diamino-benzene-stibonic acids to react with phosgene or by causing diazotized amino-benzimidazolones to react with antimonious acid.

The said stibonic acids can furthermore be obtained by causing the quantity of chlorocarbonic acid ester which is required for the reaction with one $NH_2$-group to act upon an ortho-diamino-benzene-stibonic acid and by heating the resulting urethane.

The formulæ in the following examples and claims only correctly express the position of the stibonic acid residue in the phenyl nucleus, whereas the manner in which the antimony is bound is not definitely known. The chemical formulæ of the stibonic acid are generally written for simplicity's sake in a manner analogous to that of the arsonic acid. The stibonic acids are, however, really always polymeric and contain, according to the manner in which they have been dried, more or less water, about the binding of which within the molecule nothing certain is known.

The following examples serve to illustrate our invention, but they are not intended to limit it thereto.

(1) Into a solution of 27 grams of 3-amino-4-methylamino-benzene-1-stibonic acid in 200 cc. of normal caustic soda solution, mixed with 14 grams of sodium acetate, phosgene is introduced until it shows an acid reaction to Congo paper. Thereby the 1-methyl-2-benzimidazolone-5-stibonic acid of the following probable formula:

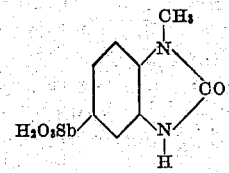

separates in the form of a finely divided precipitate, which is filtered by suction, washed with water and dried. It forms a colorless powder which is readily soluble in diluted alkalies, ammonia or organic bases; when heated, it chars without melting.

(2) To a solution of 25 grams of 3.4-diaminobenzene-1-stibonic acid in 200 ccm. of normal caustic soda solution are added 14 grams of sodium acetate and phosgene is introduced until there is an acid reaction to Congo paper. The 2-benzimidazolone-5-stibonic acid separates and is isolated as described in Example 1. It forms a white powder, which dissolves in diluted alkalies and organic bases and has the following probable formula:

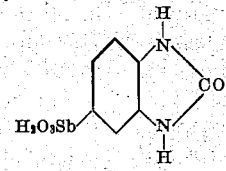

(3) A solution of 28 grams of 3.4-diamino-5-chlorobenzene-1-stibonic acid in 200 cc. of normal caustic soda solution is transformed with phosgene in the presence of sodium acetate as described in Example 2. The 7-chloro-2-benzimidazolone-5-stibonic acid is likewise a white powder which is soluble in diluted alkalies.

(4) 16.4 grams of 1-methyl-5-amino-2-benzimidazolone (cf. Chemisches Zentralblatt, 1926, II, page 2064) are diazotized in 150 cc. of water and 24 cc. of hydrochloric acid (d=1.19) with the calculated quantity of sodium nitrite. The diazo solution is introduced while stirring into an antimonite solution, which may be prepared in the following manner: 16 grams of antimony trioxide are dissolved while heating in 200 cc. of water, 50 cc. of glycerine and 35 cc. of caustic soda solution of 40° Bé. For the transformation process the solution is preferably cooled to room temperature.

When the evolution of nitrogen has ceased and the solution no longer couples with resorcine, the solution is neutralized first with hydrochloric acid and then with carbonic acid until it shows only a feebly alkaline reaction to turmeric. The solution is then filtered, cleared with animal charcoal and hydrochloric acid is added until there is an acid reaction to Congo paper, and the 1-methyl-2-benzimidazolone-5-stibonic acid described in Example 1 separates. After filtering by suction, washing and drying, it forms a colorless powder which is easily soluble in diluted alkalies, ammonia and organic bases; when heated, it chars without melting.

The diazo solution can also be caused to react with an acid antimony trichloride solution and the resulting double compound can be decomposed by means of caustic soda solution.

(5) 18.76 grams of 1-ethyl-5-amino-2-benzimidazolone hydrochloride are diazotized in a hydrochloric acid solution and treated with an antimonite solution from 16 grams of antimony trioxide as described in Example 4, and then worked up. The 1-ethyl-2-benzimidazolone-5-stibonic acid thus obtained has the same properties as the benzimidazolone-stibonic acid described in Example 4. It has the following probable formula:

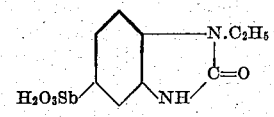

(6) 19 grams of 5-amino-2-benzimidazolone-hydrochloride (prepared for instance according to "Hager" Berichte der deutschen chemischen Gesellschaft, volume 17, page 2631) are diazotized in 100 cc. of water, mixed with 16 cc. of concentrated hydrochloric acid by means of the calculated quantity of sodium nitrite. The diazo solution is caused to react with an antimonite solution as described in Example 4 and the resultant 2-benzimidazolone-5-stibonic acid is isolated in the usual manner. It forms a white powder which is soluble in diluted alkalies, ammonia or the like and has the formula indicated in Example 2.

(7) 22 grams of 5-amino-7-chloro-2-benzimidazolone-hydrochloride, prepared for instance by causing 6-chloro-4-nitro-1.2-diaminobenzene to react with phosgene and subsequently catalytically reducing the nitro compound, are diazotized as described in the Examples 4 to 6 and caused to react with antimonite solution.

The resultant 7-chloro-2-benzimidazolone-5-stibonic acid of the probable formula:

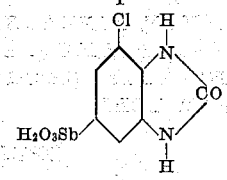

forms a white powder which is readily soluble in diluted alkalies; when heated, it chars without melting.

(8) A solution of 3.4-diaminobenzene-stibonic acid, obtainable for instance by heating for 45 minutes on the steam bath a solution of 36 grams of 3.4-diacetyl-diamino-benzene-stibonic acid in 500 cc. of water and 40 cc. of caustic soda solution of 40° Bé. in order to saponify the acetyl group, is cooled to 0° C. and hydrochloric acid is added until there is a feebly alkaline reaction to turmeric. Into this solution 12 grams of chlorocarbonic acid ethyl ester and 12 cc. of 5N caustic soda solution are simultaneously introduced drop by drop while vigorously stirring and cooling with ice, so that the solution shows a feebly alkaline reaction to turmeric until the caustic soda solution is consumed. Then the whole is further stirred for 2 hours at room temperature, acidified until there is a pronounced acid reaction to Congo paper and boiled. The benzimidazolone-stibonic acid described in Example 2 separates in the form of a white precipitate, which is filtered by suction, washed and dried in the usual manner.

In the preceding examples the stibonic acid residue can, of course, also stand in 4- or in 7-position in the benzene nucleus. Furthermore the benzene nucleus can be wholly or partly substituted by substituents such as alkyl, halogen, the amino- or the nitro group.

Quite generally speaking there can stand in 1-position instead of the methyl group (Example 1) or the ethyl group (Example 5) also any higher alkyl.

We claim:

1. A compound of the following probable formula:

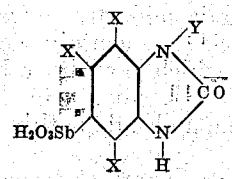

wherein one X stands for chlorine, the other X's stand for hydrogen and Y stands for hydrogen or alkyl.

2. A compound of the following probable formula:

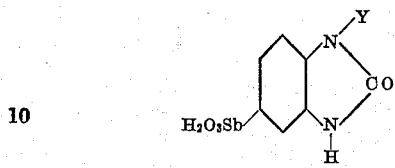

wherein Y stands for hydrogen or alkyl.

3. The 1-ethyl-2-benzimidazolone-5-stibonic acid, forming a colorless powder which is easily soluble in diluted alkalies, ammonia and organic bases and which chars when heated without melting.

4. The 1-methyl-2-benzimidazolone-5-stibonic acid, forming a colorless powder which is easily soluble in diluted alkalies, ammonia and organic bases and which chars when heated without melting.

5. The 2-benzimidazolone-5-stibonic acid, forming a white powder which dissolves in diluted alkalies, ammonia and organic bases.

In testimony whereof, we affix our signatures.

KARL STREITWOLF.
ALFRED FEHRLE.
WALTER HERRMANN.